Patented June 8, 1948

2,442,982

UNITED STATES PATENT OFFICE 2,442,982

DESULFURIZATION OF HYDROCARBONS

Frederick C. Nachod, Haddonfield, N. J., assignor to The Atlantic Refining Company, Philadelphia, Pa., a corporation of Pennsylvania No Drawing. Application March 19, 1946, Serial No. 655,612

2 Claims. (Cl. 196—28)

The present invention relates to the desulfurization of hydrocarbons containing sulfur compounds, and relates more particularly to the desulfurization of petroleum distillates and gases by treatment with heavy metal alumino-silicates at elevated temperatures.

It has been proposed heretofore to desulfurize or sweeten gasoline and lower boiling hydrocarbons by contacting with metal salts or oxides deposited upon inert carriers such as clay, fuller's earth, and the like. It is significant, however, that the salts are not tightly held on the carrier, and there is considerable evidence that the metal salts, and particularly copper compounds, migrate through the treating beds and are carried out with the hydrocarbons treated. The shortcomings of such impregnated treating materials are of a dual nature, e. g., the active reagent is lost from the treating bed, and the hydrocarbons under treatment become contaminated with the reagent.

It is an object of this invention to overcome these difficulties, and to fix the heavy metal ion in such a manner that it is still capable of effecting the desulfurizing reaction, yet is bound so tightly to the carrier that it cannot be eluded, with resulting loss in capacity and contamination of the hydrocarbons under treatment.

In accordance with this invention, this may be accomplished by fixing the cation in a cation exchanger in the following manner:

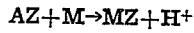

In this equation AZ represents a siliceous cation exchanger, and is exemplified by an alkali metal alumino-silicate such as sodium or potassium alumino-silicate, and M to be substituted in the exchange position is a heavy metal such as copper, cadmium, lead, mercury, silver, zinc, tin, cobalt, nickel, iron, antimony, and bismuth.

In preparing the desulfurizing agent, a cation exchanger may first be formed by reaction, for example, sodium aluminate, sodium silicate, and alum in suitable proportions in aqueous solution at a pH between 3 and 9. The ratio of aluminate to silicate to alum may be such that in the exchanger product, which may be formulated

the ratio of Na2O to Al2O3 to SiO2 may range from 1:1:2 to 1:1:8. The resulting sodium aluminosilicate is then thoroughly washed to remove soluble salts, and dried. The dried material is then treated with an aqueous solution of a heavy metal salt under conditions such as to replace the sodium content of the alumino-silicate with heavy metal ions. The final heavy metal alumino-silicate is then water washed to remove excess heavy metal salt solution, and the product is dried at a suitable temperature, for example, 100° C.

In order to effect desulfurization of hydrocarbons containing sulfur compounds such as hydrogen sulfide, mercaptans, sulfides, and disulfides, the hydrocarbons are brought into intimate contact with the heavy metal alumino-silicate at an elevated temperature between 200° F. and 1000° F., and preferably between 400° F. and 900° F. Such contacting may be carried out in the vapor phase or the liquid phase, depending upon the pressure applied to the treating system. A very satisfactory mode of operation comprises providing a bed of heavy metal alumino-silicate particles of suitable mesh size, heating the hydrocarbons to the temperature desired, and passing the liquid or vaporous hydrocarbons through the bed of treating agent. The bed of agent may be supplied with heat from an external source in the event that the contained heat of the hydrocarbons is insufficient to hold the agent at the desired level. The treated hydrocarbons withdrawn from the bed may be fractioned if necessary or may be treated with basic substances to remove hydrogen sulfide produced during the treatment. For example, the hydrocarbons, after treatment with the heavy metal alumino-silicate, may be cooled and washed with aqueous solutions of alkali such as sodium hydroxide, or with aqueous alcoholic solutions of organic or inorganic bases. The heavy metal alumino-silicate, after prolonged use, may lose activity due to the accumulation of carbonaceous or tarry matter, or the partial conversion of the heavy metal to sulfide, and at such stage may be regenerated by treatment with steam and air, or a mixture thereof, at elevated temperature, for example, 700° F. to 1000° F., and preferably 800° F. to 900° F. The regenerated agent may then be brought to the desired desulfurization temperature and reused for the treatment of additional quantities of hydrocarbons containing sulfur compounds.

My invention may be further illustrated by the following examples, which, however, are not to be construed as limiting the scope thereof.

Lead alumino-silicate was prepared by stirring 100 parts by weight of a commercial sodium alumino-silicate (20–200 mesh "Decalso" manufactured by the Permutit Co.) with 500 parts by volume of 0.5 N lead acetate solution for 1 hour. After settling, the supernatant liquid was removed, and the same steps were repeated three times with fresh lead acetate solution. Unreacted lead acetate was removed from the resulting lead alumino-silicate by water washing, and the product was dried at 100° C.

Copper alumino-silicate was prepared in the same manner, using an 0.5 N solution of cupric acetate. It is to be understood, of course, that soluble heavy metal salts other than acetates may also be used in the preparation of the desulfurizing agents, such salts including by way of example, the nitrates, sulfates, and chlorides of the heavy metals.

The lead and copper alumino-silicates as above prepared were formed into beds in suitable vessels, and a petroleum naphtha containing sulfur compounds was vaporized and passed through the beds at various temperatures. The space velocity during the treatment was held at 2 volumes of naphtha per volume of heavy metal alumino-silicate per hour. The operating conditions and the desulfurization results are given in the following table.

| Desulfurizing Agent | Desulfurizing Temp., °F. | Per Cent Sulfur in Naphtha | |
|---|---|---|---|
| | | Analysis | Per Cent Reduction |
| None | | 0.168 | |
| Lead alumino-silicate | 400 | 0.132 | 22 |
| Do | 550 | 0.096 | 43 |
| Do | 700 | 0.106 | 37 |
| Do | 900 | 0.107 | 36 |
| Copper alumino-silicate | 700 | 0.111 | 34 |
| Lead Alumino-silicate (regenerated) | 700 | 0.118 | 33 |

While in the above examples, the space velocity was maintained at 2, satisfactory desulfurization may be obtained at either higher or lower velocities, i. e., as high as about 5 and as low as 0.1. Furthermore, various hydrocarbons or mixtures thereof other than naphtha may be desulfurized. For example, substantial sulfur reduction may be obtained in the treatment of straight run or cracked gasoline, kerosine, furnace oil, benzol, tar distillates, and hydrocarbon gases, utilizing the method of the present invention.

I claim:

1. The method of desulfurizing hydrocarbons containing sulfur compounds, which comprises contacting said hydrocarbons with lead alumino-silicate at a temperature between 400° F. and 900° F.

2. The method of desulfurizing petroleum naphtha containing sulfur compounds, which comprises contacting said naphtha with lead alumino-silicate at a temperature between 400° F. and 900° F.

FREDERICK C. NACHOD.

REFERENCES CITED

The following references are of record in the file of this patent:

UNITED STATES PATENTS

| Number | Name | Date |
|---|---|---|
| 1,728,732 | Jaeger | Sept. 17, 1929 |

FOREIGN PATENTS

| Number | Country | Date |
|---|---|---|
| 270,314 | Great Britain | June 30, 1928 |
| 484,368 | Great Britain | May 4, 1938 |